April 29, 1952  F. GRIFFITH  2,595,073
BAND SAW LOG COPING SAWING MACHINE
Filed Jan. 5, 1950  2 SHEETS—SHEET 1
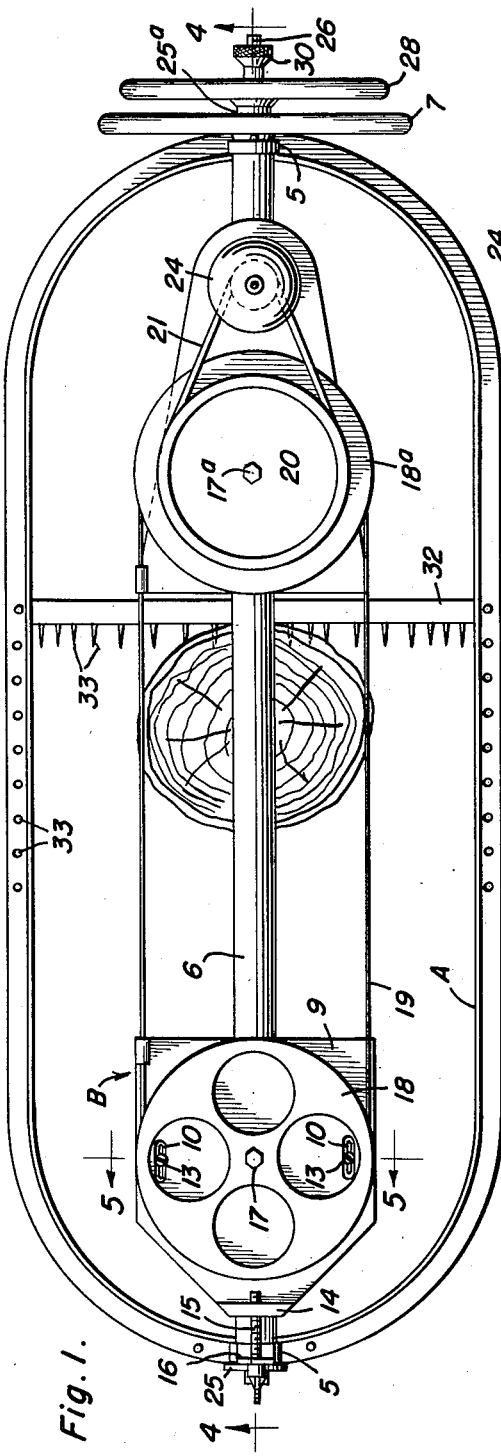
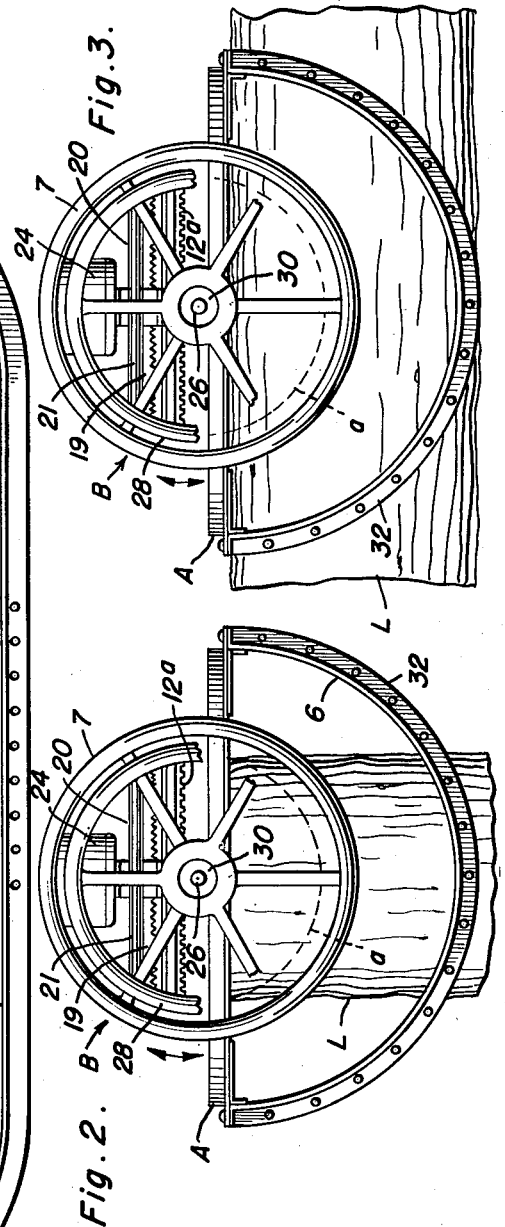
Inventor
Frederick Griffith
By *Clarence A. O'Brien and Harvey B. Jacobson*
Attorneys April 29, 1952     F. GRIFFITH     2,595,073
BAND SAW LOG COPING SAWING MACHINE
Filed Jan. 5, 1950     2 SHEETS—SHEET 2
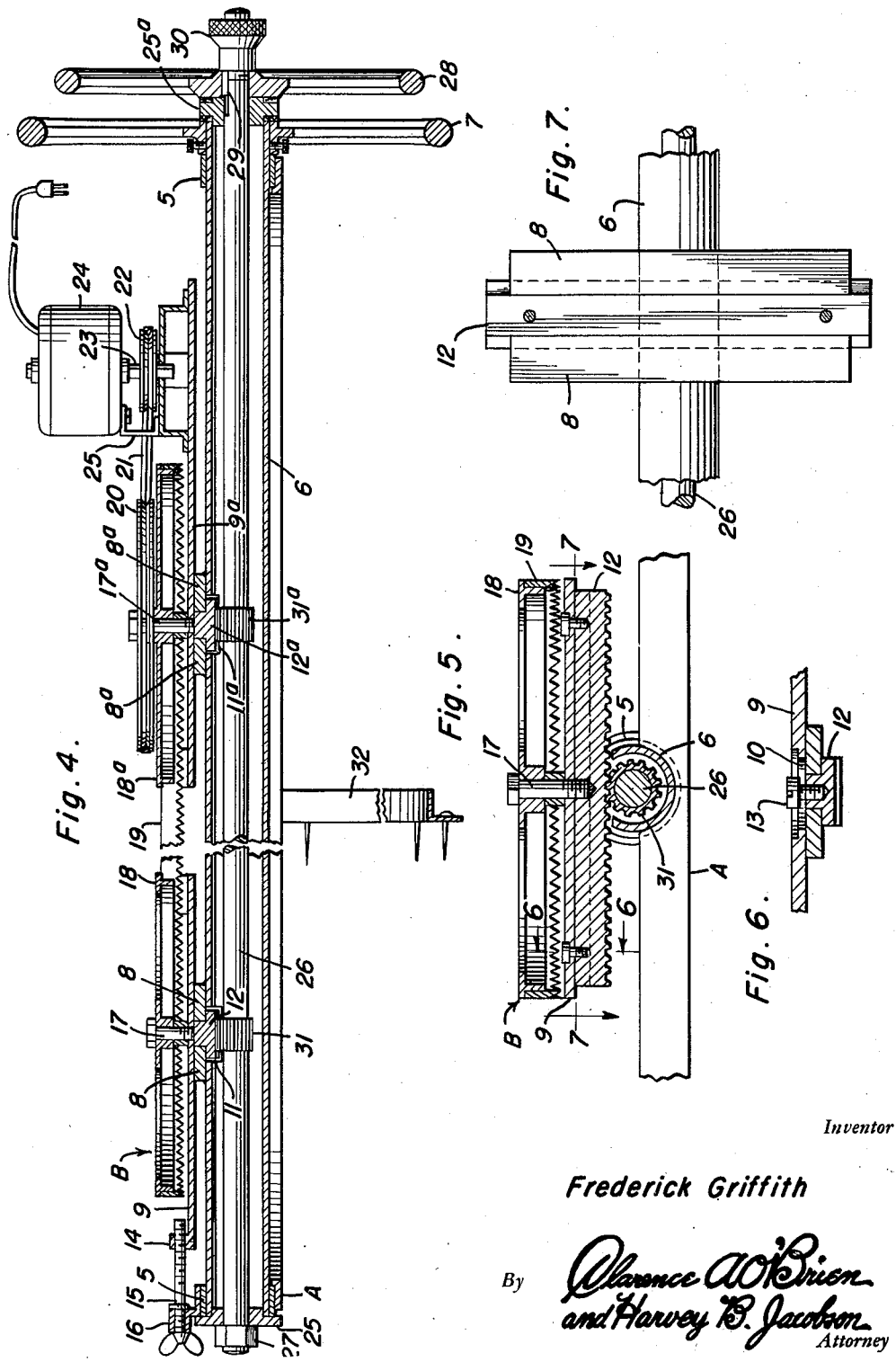
Inventor
Frederick Griffith Patented Apr. 29, 1952

2,595,073

UNITED STATES PATENT OFFICE 2,595,073

BAND SAW LOG COPING SAWING MACHINE

Frederick Griffith, Hillman, Mich.

Application January 5, 1950, Serial No. 136,882

4 Claims. (Cl. 143—26)

1

This invention relates to a sawing machine particuarly adapted for use in coping or cutting half-round notches or grooves in logs to facilitate interfitting of the logs as shown in the U. S. patents to C. Tahvonen et al., No. 2,040,110, May 12, 1936 (at 13 in Fig. 7); and W. C. Drake, No. 2,416,162, February 18, 1947 (at 15 in Fig. 2).

An object of the present invention is to provide a sawing machine of the above kind which is comparatively simple in construction, easy to use, and efficient in operation.

Another object is to provide a machine for the purpose specified above which may be readily adjusted to cut notches or grooves of different radii.

A further object is to provide a portable machine of the above kind which includes a frame adapted to be disposed or supported on the log being notched or grooved, and a sawing unit rotatably mounted in said frame, said sawing unit including a motor-driven band saw passing around spaced wheels and being rotatable about an axis intersecting the axes of said wheels, whereby either run of the bandsaw between said wheels may engage and cut the notch or groove in the log.

A more specific object is to provide means to adjust the sawing unit relative to the frame and the axis of rotaion of said unit transversely of said axis, whereby notches or grooves of different radii may be cut in the logs.

Other objects and features of the invention will become apparent from the following description when considered with the accompanying drawings, in which:

Figure 1 is a plan view of a sawing machine embodying the present invention positioned to cut a notch in an end of a log.

Figure 2 is a view looking to the left of Figure 1, partly broken away.

Figure 3 is a view similar to Figure 2 showing the machine positioned to cut a transverse notch in one side of a log.

Figure 4 is an enlarged longitudinal section, partly broken away, taken on the line 4—4 of Figure 1.

Figure 5 is a fragmentary transverse section taken on the line 5—5 of Figure 1.

Figure 6 is a fragmentary vertical section taken on the line 6—6 of Figure 5.

Figure 7 is a fragmentary horizontal section taken on the line 7—7 of Figure 5.

Referring in detail to the drawings, A indicates an oblong open frame having alined bearings 5 secured thereon centrally of the ends thereof.

2

Rotatably mounted in the frame is a sawing unit B including a tubular supporting shaft 6 journaled at one end and near the other end in the bearings 5. The projecting end of shaft 6 has a hand wheel 7 secured thereon for use in turning the same. The sawing unit also includes pairs of spaced parallel crossbars 8 and 8a fixed midway between their ends on the shaft 6. Disposed on the crossbars 8 is a plate 9 provided near the side edges thereof with longitudinal elongated slots 10. A somewhat similar plate 9a is disposed on the crossbars 8a. Transverse slots 11 and 11a are provided in the top of shaft 6, and extending through these slots are transverse rack bars 12 and 12a having central top ribs respectively slidably fitted between the crossbars 8 and the crossbars 8a and suitably secured to the under sides of the plates 9 and 9a. The rack bar 12 is secured to the plate 9 by screws 13 (Figure 6) extending through the slots 10, so that plate 9 may be adjusted toward or away from plate 9a upon loosening the screws 13, for a purpose to be later explained. The outer end of plate 9 has a flange 14 provided with a threaded opening in which is removably screwed an adjusting screw 15 journaled in a bracket 16 fixed on the adjacent bearing 5. The plates 9 and 9a have upstanding pintles 17 and 17a on which wheels 18 and 18a are journaled, and a band saw 19 passes around these wheels. Secured on the hub of wheel 18a is a pulley 20, and a power transmitting belt 21 passes around the pulley 20 and a further pulley 22 secured on the drive shaft 23 of an electric motor 24 supported at 25 on the outer end portion of plate 9a. It will be apparent that motor 24 will drive the band saw when thrown into operation. Also, screw 15 may be operated to move the wheel 18 away from wheel 18a and thereby tension the saw band 19.

Thrust and bearing plates or disks 25 and 25a (Figure 4) are fitted in and against the ends of shaft 6, and a shaft 26 is journaled in these plates or disks and extends through the shaft 6 axially of the latter. The shaft 26 has an abutment 27 on one end thereof disposed against the outer side of disk 25, and a second hand wheel 28 of smaller diameter than the hand wheel 7 is slidably keyed as at 29 on the shaft 26 at the outer side of disk 25a. The other end of shaft 26 has a nut 30 adjustably threaded thereon, and such nut is disposed against the outer side of the hub of hand wheel 28. Pinions 31 and 31a are secured on shaft 26 and respectively mesh with the rack bars 12 and 12a. It will be seen that when nut 30 is tightened to set up tight frictional engagement between the elements 5, 7, 25a and 28 and the elements 5, 25 and 27, the shafts 6 and 26 will be held against turning. On the other hand, when the nut 30 is loosened, hand wheel 7 may be turned, while hand wheel 28 is manually held against turning relative to the wheel 7, so as to rotate the sawing unit about the axis of shaft 6 and thereby cause the saw band to cut a half round notch in the log L, as indicated by dotted lines at a (Figures 2 and 3), when the saw band is driven. By holding hand wheel 7 against turning and turning hand wheel 28, the shaft 26 and pinions 31 and 31a may be rotated to shift the sawing unit B transversely of the frame relative to shaft 6, thereby changing the radius of the cut made by the saw band to accord with the diameter of the log. Of course, the adjusting screw 15 can only be engaged with the flange 14 when the threaded opening of the latter is alined therewith, and this set screw is disengaged from the flange 14 when the sawing unit is adjusted laterally off center.

A depending or lateral arcuate log abutting member 32 is disposed transversely of the frame A adjacent the wheel 18a and is secured at its ends to opposite sides of said frame. Log engaging spikes 33 project inwardly from the member 32 and downwardly from the frame at the inner side of the member 32. When cutting a notch in an end of a log as shown in Figures 1 and 2, the log is preferably horizontally supported upon saw horses in an elevated position, and the member 32 is disposed on top of the log with its spikes driven into the latter to hold the vertically disposed frame in place at the end of the log. When cutting a notch in the top side of a log, the latter is similarly supported, and the frame is disposed on and across the log with the member 32 engaged with one side thereof, the spikes of the frame and the member 32 being driven into the log (as shown in Figure 3).

From the foregoing description, the construction, operation and advantages of the present invention will be apparent to those skilled in the art. The machine will quickly cut notches of the required form in logs and will overcome the disadvantages of cutting them by means of a hammer and chisel as heretofore practised. Modifications and changes in details of construction are contemplated within the spirit of the invention as claimed.

What is claimed as new is:

1. A log coping sawing machine comprising an open oblong frame, a sawing unit rotatably mounted in the frame for rotation about an axis disposed longitudinally of the latter and including a motor driven saw band having a run located to one side of and parallel with the axis of rotation of said unit to cut a substantially half round notch in a log when the unit is rotated and the saw band is driven, manually operable means to rotate the sawing unit, a transverse log-abutting member being attached between the sides of and projecting laterally from said frame, and log-engaging spikes carried by said log-abutting member.

2. A log coping sawing machine comprising an open oblong frame, a sawing unit rotatably mounted in the frame for rotation about an axis longitudinally and medially disposed relative to said frame and including a motor driven saw band having a run located to one side of and parallel with the axis of rotation of said unit to cut a substantially half round notch in a log when the unit is rotated and the saw band is driven, manually operable means to rotate the sawing unit, means mounting the sawing unit for lateral adjustment relative to the longitudinal axis of and in a plane parallel to the plane of said frame, and manually operable means to laterally adjust said unit for varying the radius of the cut made by the saw band.

3. A log coping sawing machine comprising an open oblong frame, a sawing unit rotatably mounted in the frame for rotation about an axis longitudinally and medially disposed relative to said frame and including a motor driven saw band having a run located to one side of and parallel with the axis of rotation of said unit to cut a substantially half round notch in a log when the unit is rotated and the saw band is driven, manually operable means to rotate the sawing unit, means mounting the sawing unit for lateral adjustment relative to the longitudinal axis of and in a plane parallel to the plane of said frame, manually operable means to laterally adjust said unit for varying the radius of the cut made by the saw band, and manually operable means to secure the sawing unit against rotation and lateral adjustment.

4. A log coping sawing machine comprising an open oblong frame, a sawing unit rotatably mounted in the frame for rotation about an axis longitudinally and medially disposed relative to said frame and including a motor driven saw band having a run located to one side of and parallel with the axis of rotation of said unit to cut a substantially half round notch in a log when the unit is rotated and the saw band is driven, manually operable means to rotate the sawing unit, means mounting the sawing unit for lateral adjustment relative to the longitudinal axis of and in a plane parallel to the plane of said frame, manually operable means to laterally adjust said unit for varying the radius of the cut made by the saw band, said last-named means including transverse rack bars carried by the sawing unit, and an operating shaft journaled in the frame concentric with the axis of rotation of the sawing unit and having pinions secured thereon in mesh with said rack bars.

FREDERICK GRIFFITH.

REFERENCES CITED

The following references are of record in the file of this patent:

UNITED STATES PATENTS

| Number | Name | Date |
|---|---|---|
| 18,960 | Davis | Dec. 29, 1857 |
| 308,188 | Miller | Nov. 18, 1884 |
| 341,667 | Leitelt | May 11, 1886 |
| 1,054,693 | Klingele | Mar. 4, 1913 |
| 1,485,527 | Raeber | Mar. 4, 1924 |
| 1,518,198 | Hearne | Dec. 9, 1924 |
| 1,607,784 | Spangler | Nov. 23, 1926 |
| 2,040,110 | Tahvonen et al. | May 12, 1936 |
| 2,416,162 | Drake | Feb. 18, 1947 |

FOREIGN PATENTS

| Number | Country | Date |
|---|---|---|
| 425,154 | France | Mar. 29, 1911 |